United States Patent [19]
Abe

[11] Patent Number: 5,230,137
[45] Date of Patent: Jul. 27, 1993

[54] METHOD FOR FASTENING TOGETHER TWO OR MORE NON-ALIGNED PARTS

[75] Inventor: Tetsuo Abe, Rochester Hills, Mich.

[73] Assignee: Sanyo Machine America Corporation, Rochester, Mich.

[21] Appl. No.: 789,856

[22] Filed: Nov. 8, 1991

[51] Int. Cl.⁵ .............................................. B23P 11/02
[52] U.S. Cl. ................................. 29/525.1; 403/408.1
[58] Field of Search ............... 29/525.1; 403/279, 281, 403/282, 408.1; 411/387, 411, 166, 176

[56] References Cited

U.S. PATENT DOCUMENTS

| | | | |
|---|---|---|---|
| 3,099,335 | 7/1963 | Sklar | 29/525.1 |
| 3,812,639 | 5/1974 | Sygnator | 403/408.1 |
| 3,932,050 | 1/1976 | Yahraus | 403/408.1 X |
| 4,998,332 | 3/1991 | Dacey, Jr. | 29/525.1 X |
| 5,108,296 | 4/1992 | Takano et al. | 403/408.1 X |

FOREIGN PATENT DOCUMENTS

| | | | |
|---|---|---|---|
| 1191632 | 11/1985 | U.S.S.R. | 403/408.1 |
| 1222913 | 4/1986 | U.S.S.R. | 403/408.1 |
| 2202603 | 9/1988 | United Kingdom | 403/408.1 |

Primary Examiner—Mark Rosenbaum
Assistant Examiner—S. Thomas Hughes
Attorney, Agent, or Firm—Weintraub, DuRoss & Brady

[57] ABSTRACT

A method for fastening together two or more parts with a fastener through fastening holes where either the fastener is misaligned with the holes or the fastener and one of the parts are both misaligned with the fastening hole of the other part. A depression having a throughbore is formed in one part and defines one fastening hole and cooperates with a self-tapping fastener to fasten the parts together and bring the fastener into alignment with the parts. The depression deforms to accomplish the alignment of the fastener and the parts.

14 Claims, 1 Drawing Sheet

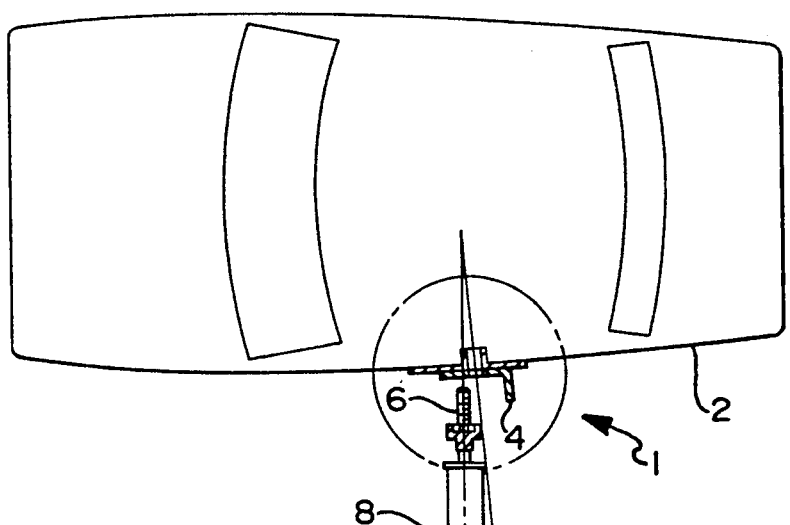
FIG 1
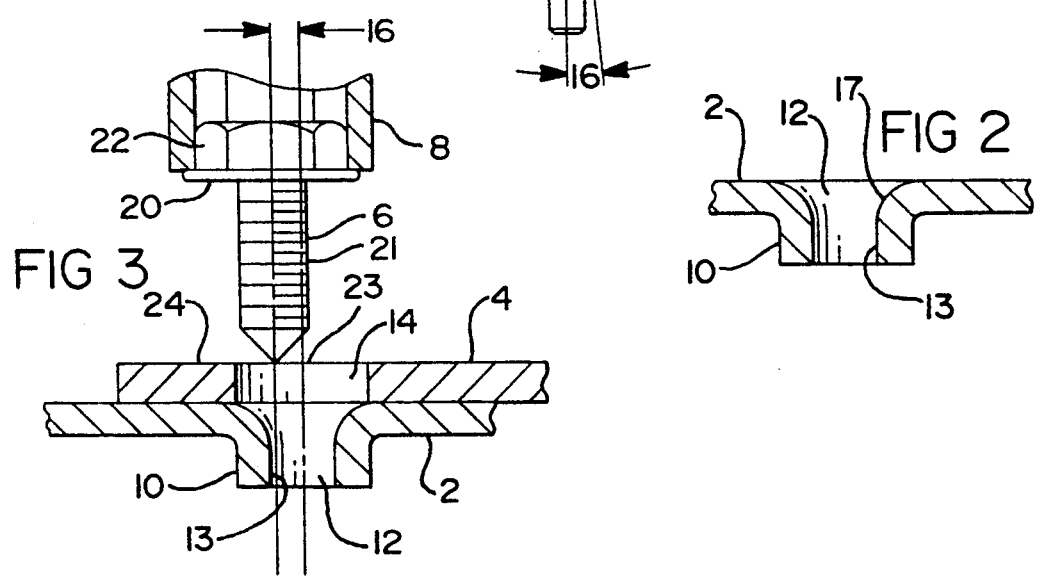
FIG 2
FIG 3
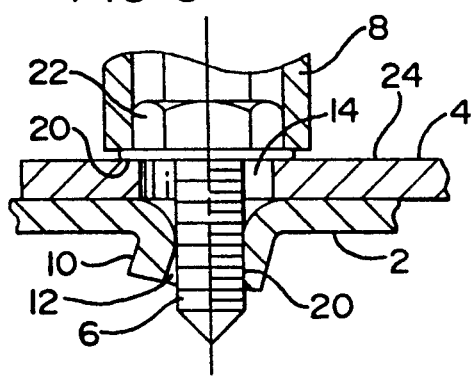
FIG 5
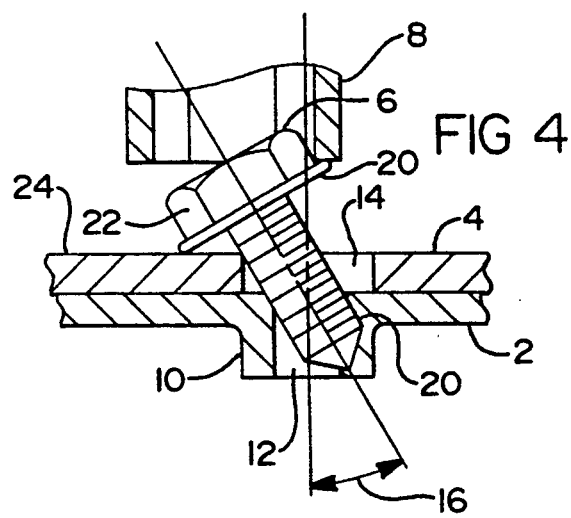
FIG 4

METHOD FOR FASTENING TOGETHER TWO OR MORE NON-ALIGNED PARTS

BACKGROUND OF THE INVENTION

1. Field of the Invention

This invention relates to methods of fastening. More particularly, this invention relates to a method for fastening together two or more non-aligned parts and/or two or more aligned parts with a non-aligned fastener and/or two or more non-aligned parts with a non-aligned fastener.

2. Prior Art

Methods or procedures for fastening together two or more parts through registering apertures are well-known in the art. This is especially true where the parts to be fastened have aligned fastening holes and the parts are fastened together with a fastener, such as a bolt or the like, which project through the holes. However, not as commonly known are methods for fastening parts together with bolts, screws or the like, where the center line of the fastening holes of the parts to be fastened are not aligned with each other or where they are not aligned with the fastener or fastening device.

One known method for resolving the issue of misalignment between the parts and the fastening device is to use a floating nut arrangement. In such an arrangement, a pocket or chamber is formed in one of the parts which houses a nut. A fastener is then projected into the housing. Since the nut moves freely within the chamber, the nut adjusts to align with and engage the incoming fastener. However, this method is cumbersome and expensive, since it requires at least the formation of the chamber and the insertion of the nut into the chamber.

Another known method for fastening, while compensating for misalignment, is a "vision" system. Herein a camera or charge couple device seeks out or senses the alignment of a fastening hole(s) and a fastener and, then, relays that information to a processing controller. In turn, the controller relays the information to either an automatic tool device which inserts the fastener into the fastening hole(s) or to an operator who manually inserts the fastener. This method is exotic as well as expensive and is subject to the accuracy limitations built into the vision systems presently on the market.

Another known method used to accommodate misalignment between parts and fasteners is to weld a nut on one of the parts. In this method, a nut is welded to the underside of a fastening hole of one of the parts to be fastened. The nut, then, provides a solid base for aligning a misaligned fastener with the fastening hole. Ordinarily, the fastener will not engage the nut unless it is properly aligned therewith. This forces either an operator or an automatic tool device to provide for some kind of method for aligning the fastener with the nut. This method, again, requires an additional part, i.e. a nut, as well as an additional operation and, usually, additional sensing devices to sense the misalignment and make the necessary adjustments.

Each of the methods or techniques, as set forth above, are difficult to implement and are expensive. Therefore, it would be desirable to have a method for fastening together two or more parts where the parts and/or the fastener are misaligned and which would easily resolve any misalignment with as few operations as possible; with few parts, and with little additional assistance. Further, it would be desirable to have a fastening method for fastening together two or more misaligned parts and/or fasteners which is inexpensive and reasonably simple to implement. It is to this which the present invention is directed.

SUMMARY OF THE INVENTION

The present invention provides a method of fastening together two or more parts, with a fastener, where either the fastener is misaligned with the parts and/or where the fastener and/or one or more of the parts are misaligned with another part. The method hereof, generally, comprises the steps of:

(a) providing at least a first part and a second part which are to be fastened together through alignable fastening holes formed in the parts;

(b) forming at least one depression in the first part, the depression having a throughbore formed therethrough, the depression including an interior wall having an entry into the throughbore, the throughbore defining the fastening hole of the first part;

(c) associating at least the second part with the first part, the fastening hole of the second part having a diameter at least equal to or larger than the throughbore of the depression;

(d) associating the fastening hole of the second part with the throughbore;

(e) inserting and rotating a self-tapping fastener through the fastening hole of the second part into the throughbore such that any misalignment therebetween causes the fastener to engage the interior wall of the depression and tap thereinto, the depression deforming to adjust to the alignment of the fastener; and wherein continued rotation of the fastener causes the fastener to create a thread path in the wall of the depression and further continued rotation causes the fastener to engage the second part to urge the fastener into a position normal to the surface of the second part, the depression deforming to the movement of the fastener, and further wherein subsequent rotation of the fastener causes the fastener to generate a force which clamps together the first and second part.

Preferably, the process is carried out where the depression is provided on sheet metal parts or the like.

Formation of the depression and its throughbore, such as by stamping or the like, in the sheet metal part permits a self-tapping fastener, whether aligned or misaligned, to enter the throughbore and establish its own thread path. The fastener shapes the depression to accommodate for the alignment as the head of the fastener urges against the surface of the second part.

Any number of depressions may be formed in the sheet metal part in accordance herewith.

The self-tapping fasteners, which may be self-tapping screws or the like, are installed using a fastening tool which rotates the fastener that is being inserted into the fastening hole of the second part and into the throughbore of the depression. This rotation causes the fastener to create its own thread path in the wall of the depression consistent with the alignment of the fastener. The fastening tool may be equipped with a sensing feedback for applying torque or defining the angle of rotation which will stop the rotation at a predetermined value.

Other attendant advantages of the present invention will become more readily appreciated as the same become better understood by reference to the following detailed description when considered in connection with the accompanying drawings in which like refer-

BRIEF DESCRIPTION OF THE DRAWINGS

FIG. 1 is a top plan view of a vehicle showing an enlarged section of the fastening method of the present invention;

FIG. 2 is a cross-sectional view of a depression and a throughbore formed in a part used in the practice of the present invention;

FIG. 3 is an exploded, cross-sectional view showing a first part with a depression, a second part with a fastening hole and a self-tapping fastener in a misaligned position;

FIG. 4 is a cross-sectional view similar to FIG. 3, showing the self-tapping fastener entering the depression; and FIG. 5 is a cross-sectional view showing the self-tapping fastener in its anchor position with the concomitant deformation of the depression.

DETAILED DESCRIPTION OF THE PREFERRED EMBODIMENT

The instant invention, as depicted in FIGS. 1-5, and as detailed hereinbelow, provides a method for fastening together two or more parts 2 and 4, respectively, through respective fastening holes 12, 14, with a fastener 6 wherein either (1) the fastener is misaligned with the fastening holes of the parts, or (2) where the fastener 6 and either the fastening hole of either the part 2 or the part 4 are misaligned with the other part 2 or 4. The method hereof, generally, comprises:

(a) providing at least a first part and at least a second part which are to be fastened together through alignable fastening holes formed in the parts;

(b) forming at least one depression in the first part, the depression having a throughbore formed therethrough, the depression including an interior wall having an entry into the throughbore, the throughbore defining the fastening hole of the first part;

(c) associating at least the second part with the first part, the fastening hole of the second part having a diameter at least equal to or larger than the diameter of the throughbore of the depression;

(d) associating the fastening hole of the second part with the throughbore of the depression;

(e) inserting and rotating a self-tapping fastener through the fastening hole of the second part into the throughbore such that any misalignment therebetween causes the fastener to engage the entry of the interior wall of the depression and tap thereinto, the depression deforming to adjust to the alignment of the fastener; and wherein continued rotation of the fastener causes the fastener to create a thread path in the wall of the depression and further continued rotation causes the fastener to engage the second part to urge the fastener into a position normal to the surface of the second part, the depression deforming in response to the movement of the fastener, and further wherein subsequent rotation causes the fastener to generate a force which clamps together the first and second parts.

As noted, the method hereof is, preferably, used when the fastener and the fastening holes of the parts are misaligned, however, the present invention can be used in those instances where either: (a) the fastener is aligned and the fastening holes of the parts are misaligned, or (b) where the fastener is aligned with the fastening hole of the second part, and the fastening holes of the first and second parts are misaligned. Also, the present invention can be used where the fastener and the fastening holes are aligned.

More particularly, and to accommodate for any misalignment between the fastening holes of the parts 2, 4 and a self-tapping fastener 6 or between the misaligned fastening holes of the parts 2, 4 and the self-tapping fastener 6, the part 2 has a depression 10 formed therein. A throughbore 12 is formed through the depression. The depression 10 is defined by an interior wall 13 which provides a tapping surface for the fastener 6, as explained below. The depression is formed by any suitable mode, such as by punching the part 2 in a die so that the depression 10 is formed with the throughbore 12. This depression 10 and throughbore 12 are, preferably, formed in the part 2 prior to being assembled with the second part 4. The throughbore 12, thus, defines the fastening holes for the first part.

As shown in the drawing, the wall 13 may be provided with a radiused entry 17 into the throughbore 12. Of course, a straight or normal entry may, likewise, be employed. The radiused entry 17, where provided, facilitates skewing of the fastener 6 into the throughbore 12 and, thus, into the wall 13, as detailed below. If the entry is not radiused, then, the point 23 on the fastener 6 facilitates entry into the throughbore 12.

The second part 4 receives a fastener 6 through a fastening hole or opening 14 stamped or otherwise formed therethrough. The hole 14, has a diameter at least equal to or larger than the diameter of the throughbore 12, as shown. This sizing assists in compensating for the misalignment.

In practicing the present invention, any suitable self-tapping fastener 6 may be used, such as a self-tapping screw or the like. As is known to those skilled in the art, a self-tapping fastener is a device having a threaded or grooved elongated shank and a pointed end, which upon rotation into a surface threadingly engages therewith. Such a fastener is well-known and commercially available.

In the practice hereof, preferably, a self-tapping screw is employed. As shown in FIGS. 3 and 4, the fastener or screw 6 has an elongated threaded shank portion 21 which terminates at a tapping point 23. A screw head 22 having a bottom surface 20 is integrally formed with the shank 21, as shown.

The installation of the self-tapping fastener 6 is, preferably, accomplished by a fastener tool 8 of the type having a feedback sensing mechanism which measures and detects the applied torque, the angle of rotation of the fastener or both. Such tools are well-known and commercially available. However, no feedback sensing mechanism is required to accomplish the fastening method of the present invention, as described herein. Indeed, any fastening tool, including manually operated tools, which can insert the fasteners may be used herein.

In use, the fastening tool 8 causes the self-tapping fastener 6 to rotate as it is approaching the associated fastening hole 14 and the throughbore 12, which may or may not be misaligned.

Since the fastening hole 14 is at least equal to in diameter or enlarged in diameter, relative to the throughbore 12 of the first part 2, the hole 14 provides sufficient clearance for the misalignment.

The fastener 6 approaches the fastening holes 12, 14. As noted, any misalignment is compensated for by the enlarged diameter of the hole 14 as well as by the point 23 of the fastener and/or the radiused entry. For example, and as shown in FIG. 4, the fastener 6 is misaligned and then enters the throughbore 12 at an angle 16. Rotation of the fastener causes the fastener to move forward within the throughbore 12, thereby engaging a portion of the entry 17 of the wall 13 of the depression 10. Rotation of the fastener causes it to create its own thread path 18 in the wall 13 at the misaligned angle 16. Concomitantly, the depression 10 is deformed to conform to the angle 16. This deformation continues until the bottom surface 20 of the head 22 of the self-tapping fastener 6 makes contact with the top surface 24 of the second part 4. After contact, continued rotation of the fastener forces the head 22 to the normal with respect to the surface 24 of the second part 4. At the same time, to accommodate the normal positioning of the screw head 22, the depression 10 will, then, return to its normal position permitting the self-tapping fastener 6 to come into alignment with the center line of the throughbore 12, as shown in FIG. 5. Further subsequent rotation of the fastener causes the fastener to generate a force which clamps together the first and second parts.

The present invention can be employed with two or more parts, so long as the first part has the throughbore and the other part overlie the first part.

It is to be appreciated from the preceding that there has been described a simple and effective method for fastening together two or more associated parts 2, 4 through their respective fastening holes with a misaligned fastener 6 or two or more parts where their fastening holes are misaligned and the fastener is aligned or an aligned fastener and fastening holes of one part with a misaligned fastening hole of the other part. The present invention as noted has particular utility in assembling sheet metal parts, such as with automotive sheet metal parts, as shown in FIG. 1.

Of course, any part may be provided with multiple depressions and throughbore combinations for alignment with alignable fastening holes 12, 14 in associated parts or panels. Likewise, the present invention can be used where the fastening holes and fastener are aligned.

Having, thus, described the invention, what is claimed is:

1. A method for fastening together two or more parts with a fastener which comprises:
  (a) providing at least a first part and a second part which are to be fastened together through alignable fastening holes formed in the parts;
  (b) forming at least one depression in the first part, the depression having a throughbore formed therethrough, the depression including an interior wall having an entry into the throughbore, the throughbore defining the fastening hole of the first part;
  (c) associating at least the second part with the first part, the fastening hole of the second part having a diameter greater than the diameter of the throughbore of the depression;
  (d) associating the fastening hole of the second part with the throughbore
  (e) inserting and rotating a self-tapping fastener through the fastening hole of the second part into the throughbore such that misalignment between the fastener and the throughbore causes the fastener to skew to engage the entry of the interior wall of the depression and tap thereinto, the depression deforming to adjust to the skew of the fastener; and
wherein continued rotation of the fastener causes the fastener to create a thread path in the interior wall of the depression and further continued rotation causes the fastener to engage the second part to urge the fastener into a position normal to the surface of the second part, the depression deforming to the movement of the fastener, and further wherein subsequent rotation of the fastener causes the fastener to generate a force which clamps together the first and second parts, said fastening being done in the absence of any alignment device disposed between the first and second parts.

2. The method of claim 1 wherein the step of forming the depression and the throughbore comprises:
  (a) placing the first part into a die press; and
  (b) punching the first part into a die so that the depression is formed with the throughbore therethrough.

3. The method of claim 1 wherein at least one of the first and second is a sheet metal part.

4. The method of claim 3 wherein the first part is a sheet metal part.

5. The method of claim 3 wherein the second part is a sheet metal part.

6. The method of claim 3 wherein the first part has a plurality of depressions and throughbores formed therein and the second part has a plurality of fastening holes formed therein, one fastening hole of the second part being associated with a corresponding depression and throughbore of the first part.

7. The method of claim 1 wherein the entry is a radiused entry.

8. A method for fastening together two or more misaligned parts with a fastener which comprises:
  (a) providing at least a first part and a second part which are to be fastened together through alignable fastening holes formed in the parts;
  (b) forming at least one depression in the first part, the depression having a throughbore formed therethrough, the depression including an interior wall having an entry into the throughbore, the throughbore defining the fastening hole of the first part;
  (c) associating at least the second part with the first part, the fastening hole of the second part having a diameter greater than the diameter of the throughbore of the depression;
  (d) associating the fastening hole of the second part with the throughbore;
  (e) inserting and rotating a self-tapping fastener through the fastening hole of the second part into the throughbore, such that misalignment between the fastener and the throughbore causes the fastener to skew to engage the entry of the interior wall of the depression and tap thereinto, the depression deforming to adjust to the skew of the fastener; and
wherein continued rotation of the fastener causes the fastener to create a thread path in the interior wall of the depression and further continued rotation causes the fastener to engage the second part to urge the fastener into a position normal to the surface of the second part, the depression deforming to the movement of the fastener, and further wherein subsequent rotation of the fastener causes the fastener to generate a force which clamps together the first and second parts, said fastening being done in the absence of any alignment device disposed between the first and second parts.

9. The method of claim 8 wherein the step of forming the depression and the throughbore comprises:
  (a) placing the first part into a die press; and (b) punching the first part into a die so that the depression is formed with the throughbore therethrough.

10. The method of claim 8 wherein at least one of the first and second parts is a sheet metal part.

11. The method of claim 10 wherein the first part is a sheet metal part.

12. The method of claim 10 wherein the second part is a sheet metal part.

13. The method of claim 10 wherein the first part has a plurality of depressions and throughbores formed therein, and the second part has a plurality of fastening holes formed therein, one fastening hole of the second part being associated with a corresponding depression and throughbore of the first part.

14. The method of claim 8 wherein the entry is a radiused entry.

* * * * *